(12) United States Patent
Hasman et al.

(10) Patent No.: US 7,190,521 B2
(45) Date of Patent: *Mar. 13, 2007

(54) SPACE-VARIANT SUBWAVELENGTH DIELECTRIC GRATING AND APPLICATIONS THEREOF

(75) Inventors: Erez Hasman, Hadera (IL); Zeev Bomzon, Kiryat Tivon (IL); Vladimir Kleiner, Nesher (IL)

(73) Assignee: Technion Research and Development Foundation Ltd., Haifa (IL)

( * ) Notice: Subject to any disclaimer, the term of this patent is extended or adjusted under 35 U.S.C. 154(b) by 0 days.

This patent is subject to a terminal disclaimer.

(21) Appl. No.: 10/484,772

(22) PCT Filed: Sep. 13, 2002

(86) PCT No.: PCT/US02/29004

§ 371 (c)(1),
(2), (4) Date: Jan. 23, 2004

(87) PCT Pub. No.: WO03/025635

PCT Pub. Date: Mar. 27, 2003

(65) Prior Publication Data

US 2004/0165269 A1    Aug. 26, 2004

(51) Int. Cl.
*G02B 5/18* (2006.01)
(52) U.S. Cl. .............. 359/569; 359/573; 359/486; 430/321
(58) Field of Classification Search ........ 359/569, 359/486

See application file for complete search history.

(56) References Cited

U.S. PATENT DOCUMENTS

| | | | |
|---|---|---|---|
| 5,343,292 A * | 8/1994 | Brueck et al. | 356/509 |
| 6,122,103 A * | 9/2000 | Perkins et al. | 359/486 |
| 6,191,890 B1 * | 2/2001 | Baets et al. | 359/572 |
| 6,391,528 B1 * | 5/2002 | Moshrefzadeh et al. | 430/321 |
| 6,771,857 B1 * | 8/2004 | Domash et al. | 385/37 |

OTHER PUBLICATIONS

Bahram Javidi and Takanori Nomura, "Polarization encoding for optical security systems", *Optical Engineering* vol. 39 No. 9 pp. 2439-2443 (2000).

N. Davidson et al., "Realization of perfect shuffle and inverse perfect shuffle transforms with holographic elements", *Applied Optics* vol. 31 No. 11 pp. 1810-1812 (1992).

(Continued)

*Primary Examiner*—Fayez G. Assaf
(74) *Attorney, Agent, or Firm*—Mark M. Friedman (57) ABSTRACT

An optical device includes a planar subwavelength grating (10) formed in a dielectric material and having a laterally varying, continuous grating vector. When used to modulate a beam of laterally uniform polarized electromagnetic radiation incident thereon, the device passes the incident beam with a predetermined, laterally varying transmissivity and/or retardation. When used to effect polarization state transformation, the device transforms a beam of electromagnetic radiation incident thereon into a transmitted beam having a predetermined, laterally varying polarization state. The device (214) can be used to provide radially polarized electromagnetic radiation for accelerating subatomic particles or for cutting a workpiece. The device (108) also can be used, in conjuction with a mechanism for measuring the lateral variation of the intensity of the transmitted beam, for measuring all four Stokes parameters that define the polarization state of the incident beam.

60 Claims, 9 Drawing Sheets

OTHER PUBLICATIONS

Uwe D. Zeitner et al., "Polarization multiplexing of diffractive elements with metal-stripe grating pixels", *Applied Optics* vol. 38 No. 11 pp. 2177-2181 (1999).

Gregory P. Nordin et al., "Micropolarizer array for infrared imaging polimetry", Journal of the Optical Society of America vol. 16 No. 5 pp. 1168-1174 (1999).

Franco Gori, "Measuring Stokes parameters by means of a polarization grating", *Optics Letters* vol. 24 No. 9 pp. 584-586 (1999).

Rigorous Coupled Wave Analysis (RCWA) (M. G. Moharam and T. K. Gaylord, "Rigorous coupled-wave analysis of metallic surface-relief gratings", Journal of the Optical Society of America, part A vol. 3 pp. 1780-1787 (1986).

N. Naciri et al., "Spectroscopic generalized ellipsometry based on Fourier analysis", *Applied Optics* vol. 38 pp. 4802-4811 (1999).

V. Sankaran et al., Comparison of polarized light propagation in biological tissues and phantoms, *Optics Letters* vol. 24, pp. 1044-1046 (1999).

M. Koashi et al., "Probabilistic manipulation of entangled photons", *Physical Review A* vol. 63 article No. 030301 (2001).

Y. Liu et al. in "Vacuum laser acceleration using a radially polarized CO2 laser beam", Nuclear Instruments and Methods in Physics Research A vol. 424 pp. 296-303 (1999).

P. C. Chou et al., "Real time principal state characterization for use in PMD compensators", *IEEE Photon Technology Letters* vol. 13 pp. 568-570 (2001).

One commonly used method of polarimetry is to measure the time dependent signal when the beam is transmitted through a rotating polarizer or quarter wave plate (Collet, pp. 103-107). E. Collet, Polarized Light (Marcel Dekker, New York, 1993).

R. Oron et al., "Continuous phase elements can improve laser beam quality", Optics Letters vol. 25 pp. 939-941 (2000)).

V. G. Niziev and A. V. Nesterov in "Influence of beam polarization on laser cutting efficiency", Journal of Physics D: Applied Physics vol. 32 pp. 1455-1461 (1999).

* cited by examiner

SPACE-VARIANT SUBWAVELENGTH DIELECTRIC GRATING AND APPLICATIONS THEREOF

FIELD AND BACKGROUND OF THE INVENTION

The present invention relates to the production and manipulation of optically polarized light and, more particularly, to a dielectric grating whose grating vector varies continuously laterally and applications of this grating.

Laterally varying polarizers have found application in a variety of fields, including optical communication, optical computers, material processing, tight focusing, polarimetry, particle trapping and particle acceleration. For the most part, the transmission axes of these polarizers vary laterally in a discontinuous manner. For example, Bahram Javidi and Takanori Nomura, "Polarization encoding for optical security systems", *Optical Engineering* vol. 39 no. 9 pp. 2439–2443 (2000), perform polarization encoding using a polarization mask that consists of a rectangular array of small linear polarizers, oriented randomly at angles between 0° and 180°. N. Davidson et al., "Realization of perfect shuffle and inverse perfect shuffle transforms with holographic element", *Applied Optics* vol. 31 no. 11 pp. 1810–1812 (1992), invert an optical perfect shuffle using an interlaced polarizing mask that is a one-dimensional array of linear polarizers oriented alternately at 0° and 90°. Uwe D. Zeitner et al., "Polarization multiplexing of diffractive elements with metal-stripe grating pixels", *Applied Optics* vol. 38 no. 11 pp. 2177–2181 (1999), do optical encryption by polarization multiplexing using an element array, some of whose elements are linear polarizers oriented at 0° and 90°. Gregory P. Nordin et al., "Micropolarizer array for infrared imaging polimetry". *Journal of the Optical Society of America* vol. 16 no. 5 pp. 1168–1174 (1999) do polimetry using an array of micropolarizers whose unit cell includes two 0° linear polarizers, one 90° linear polarizer and one 135° linear polarizer.

Franco Gori, "Measuring Stokes parameters by means of a polarization grating", *Optics Letters* vol. 24 no. 9 pp. 584–586 (1999) suggested using a polarizer whose transmission axis varies continuously laterally for the purpose of measuring the polarization state of a light beam. The embodiment of the polarizer actually suggested by Gori is only stepwise continuous: adjacent parallel strips of linearly polarizing film, with each strip's transmission axis tilted relative to its neighbors, so that the transmission axis of this polarizer is constant within each strip and discontinuous between strips.

Discontinuities in the lateral variation of the transmission axis of a polarizer can produce diffractions which degrade the optical efficiency of the polarizer. There is thus a widely recognized need for, and it would be highly advantageous to have a polarizer whose transmission axis varies laterally in a truly continuous manner.

Metal wire gratings long have been used as polarizers. When the period of a metal wire grating is much smaller than the incident wavelength, the grating acts as a polarizer, reflecting all the light polarized parallel to the wires (TE mode) and transmitting only light polarized perpendicular to the wires (TM mode). For larger, but still subwavelength, periods, some TE mode light is transmitted, and it is necessary to use vectorial solutions of Maxwell's equations to predict the behavior of such gratings. This typically is done using Rigorous Coupled Wave Analysis (RCWVA) (M. G. Moharam and T. K. Gaylord, "Rigorous coupled-vave analysis of metallic surface-relief gratings", *Journal of the Optical Society of America, part A* vol. 3 pp. 1780–1787 (1986).

SUMMARY OF THE INVENTION

According to the present invention there is provided an optical device, for manipulating incident light of at most a certain maximum wavelength, including a substantially planar grating formed in a dielectric material and having a space-variant, continuous grating vector, at least a portion of the grating having a local period less than the maximum wavelength of the incident light.

According to the present invention there is provided a method of modulating laterally uniform, polarized light of at most a certain maximum wavelength, including the steps of: (a) solving an equation $\nabla \times \overline{K}(K_0, \beta) = 0$ for a grating vector $\overline{K}$ that is defined by a wavenumber $K_0$ and by a direction $\beta$ relative to a reference direction, the modulation depending on $\beta$, $\overline{K}$ being such that at least a portion of a grating fabricated in accordance with $\overline{K}$ has a local period less than the maximum wavelength of the light; (b) fabricating the grating in a dielectric material in accordance with the grating vector $\overline{K}$; and (c) directing the light at the grating.

According to the present invention there is provided a method of imposing a laterally varying polarization state on light of at most a certain maximum wavelength, including the steps of: (a) solving an equation $\nabla \times \overline{K}(K_0, \beta) = 0$ for a grating vector $\overline{K}$ that is defined by a wavenumber $K_0$ and by a direction $\beta$ relative to a reference direction, the laterally varying polarization state being at least partially defined by $\beta$, $\overline{K}$ being such that at least a portion of a grating fabricated in accordance with $\overline{K}$ has a local period less than the maximum wavelength of the light: (b) fabricating the grating in a dielectric material in accordance with $\overline{K}$; and (c) directing the light at the grating.

According to the present invention there is provided a method of measuring a polarization state of light of at most a certain maximum wavelength, including the steps of: (a) providing a substantially planar grating having a transmission axis that varies in one lateral direction, at least a portion of the grating having a local period less than the maximum wavelength of the light; (b) directing the light at the grating; (c) measuring an intensity of the light that has traversed the grating; and (d) determining all four Stokes parameters of the light from the intensity.

According to the present invention there is provided a method of measuring a polarization state of light of at most a certain maximum wavelength, including the steps of: (a) providing a substantially planar grating having a reflection axis that varies in one lateral direction, at least a portion of the grating having a local period less than the maximum wavelength of the light; (b) directing the light at the grating: (c) measuring an intensity of the light that is reflected from the grating; and (d) determining all four Stokes parameters of the light from the intensity.

According to the present invention there is provided an optical device, for transforming an incident beam of light into a transformed beam of light, including a substantially planar grating formed in a dielectric material and having a space-variant continuous grating vector, such that the transformed beam is substantially free of propagating orders higher than zero order.

According to the present invention there is provided a method of transforming an incident beam of laterally uniform, polarized light into a modulated transmitted beam, including the steps of: (a) solving an equation $\nabla \times \overline{K}(K_0, \beta) = 0$ for a grating vector $\overline{K}$ that is defined by a wavenumber $K_0$ and by a direction $\beta$ relative to a reference direction, the modulation depending on $\beta$, $\overline{K}$ being such that the transmitted beam is substantially free of propagating orders higher than zero order; (b) fabricating the grating in a dielectric material in accordance with the grating vector $\overline{K}$; and (c) directing the light at the grating.

According to the present invention there is provided a method of transforming an incident light beam into a transmitted beam upon which is imposed a laterally varying polarization state, including the steps of: (a) solving an equation $\nabla \times \overline{K}(K_0, \beta) = 0$ for a grating vector $\overline{K}$ that is defined by a wavenumber $K_0$ and by a direction $\beta$ relative to a reference direction, the laterally varying polarization state being at least partially defined by $\beta$, $\overline{K}$ being such that the transmitted beam is substantially free of propagating orders higher than zero order; (b) fabricating the grating in a dielectric material in accordance with $\overline{K}$; and (c) directing the light at the grating.

According to the present invention there is provided a method of measuring a polarization state of an incident light beam, including the steps of: (a) providing a substantially planar grating having a transmission axis that varies in one lateral direction, the grating being operative to transform the incident beam into a transmitted beam that is substantially free of propagating orders higher than zero order; (b) directing the light at the grating; (c) measuring an intensity of the transmitted beam; and (d) determining all four Stokes parameters of the light from the intensity.

According to the present invention there is provided a method of measuring a polarization state of an incident light beam, including the steps of: (a) providing a substantially planar grating having a reflection axis that varies in one lateral direction, the grating being operative to transform the incident beam into a reflected beam that is substantially free of propagating orders higher than zero order; (b) directing the light at the grating; (c) measuring an intensity of the reflected beam; and (d) determining all four Stokes parameters of the light from the intensity.

All references to "light" herein are to be understood as referring to electromagnetic radiation generally, even though the primary application of the present invention is to infrared light.

The optical device of the present invention is a planar grating, formed in a dielectric material, whose grating vector $\overline{K}$ has a vanishing curl. The vector $\overline{K}$ is defined by its magnitude: a wavenumber, or spatial frequency, $K_0$; and by its direction $\beta$ relative to a reference direction. In fact, $\beta$ is the local transmission axis of the grating. Either $K_0$ or $\beta$ or both may vary laterally and continuously. A grating vector with the property that either $K_0$ or $\beta$ or both may vary laterally is denoted herein as a "space-variant" grating vector. The lateral variation may be periodic, for example, translationally periodic or rotationally periodic.

According to the present invention, the grating is a subwavelength grating, meaning that the local period of at least a portion of the grating is less than the maximum wavelength of the light that is manipulated by the grating. It is to be understood that the present invention may be used to manipulate either monochromatic light or polychromatic light. All references herein to a "maximum" wavelength are to the wavelength that is used to define the "subwavelength" nature of the grating (the local period of the grating is shorter than the maximum wavelength) and the "dielectric" nature of the material in which the grating is formed (the material is substantially transparent to light of the maximum wavelength). One consequence of the subwavelength nature of the grating is that the transmitted beam is substantially free of propagating orders higher than zero order. The grating behaves as a layer of uniaxial crystal, with the optical axes of the crystal perpendicular and parallel to the grating grooves (S. Y. Chou and W. Dong, *Applied Physics Letters* vol. 67 pp. 742–744 (1995)).

Preferably, the grating is formed as a plurality of grooves in a planar substrate of the dielectric material. Preferable dielectric materials include gallium arsenide and zinc selenide for infrared applications, and quartz and silica glass for visible light applications.

Although the description herein is directed at transmission gratings, it is to be understood that the scope of the present invention includes both transmission gratings and reflection gratings. In particular, the subwavelength nature of a reflection grating of the present invention leads to the reflected beam being substantially free of propagating orders higher than zero order. It will be obvious to one skilled in the art how to modify the teachings herein for the case of reflection gratings.

When used to modulate the intensity and/or retardation of laterally uniform polarized incident light, the optical device of the present invention is operative to pass or reflect the incident light with a predetermined, laterally varying transmissivity, reflectivity or retardation. Preferably, this transmissivity, reflectivity or retardation varies periodically in one lateral direction.

When used to effect polarization state transformations, the optical device of the present invention is operative to transform light incident thereon into a transmitted or reflected beam having a predetermined, laterally varying polarization state. Preferably, the transmitted or reflected beam has an azimuthal angle that varies linearly in one lateral direction. Alternatively, the transmitted or reflected beam is either radially polarized or azimuthally polarized with the radial or azimuthal polarization being either in-phase or anti-phase.

The scope of the present invention also includes a particle accelerator that is based on the optical device of the present invention. Specifically, this particle accelerator includes: (a) a source of light; (b) a first optical mechanism for forming the light into an annular beam; (c) the optical device of the present invention, for imposing radial polarization on the annular beam; (d) a second optical mechanism for focusing the radially polarized annular beam onto a focal region; and (e) a particle source for directing a beam of the particles longitudinally through the focal region.

The scope of the present invention also includes a method of cutting a workpiece. The optical device of the present invention is used to impose radial polarization on a beam of light. The radially polarized beam is directed at the workpiece to cut the workpiece.

The scope of the present invention also includes an apparatus, for measuring the polarization state of light, that is based on the optical device of the present invention. Specifically, this apparatus includes, in addition to the optical device of the present invention, a mechanism for measuring the lateral variation of the intensity of the light after the light has been manipulated by the device of the present invention.

The scope of the present invention also includes a method of modulating the intensity and/or the retardation of laterally uniform, polarized light. The equation $\nabla \times \overline{K} = 0$ is solved for the grating vector $\overline{K}$ whose direction $\beta$ gives the desired modulation. A grating is fabricated in a dielectric material in accordance with this grating vector, and the electromagnetic radiation is directed at the grating. Preferable dielectric materials include gallium arsenide and zinc selenide for infrared applications, and quartz and silica glass for visible light applications.

The scope of the present invention also includes a method of imposing a laterally varying polarization state on light. The equation $\nabla \times \overline{K} = 0$ is solved for the grating vector $\overline{K}$ whose direction $\beta$, either by itself or in conjunction with other parameters, defines the laterally varying polarization state. A grating is fabricated in a dielectric material in accordance with this grating vector, and the electromagnetic radiation is directed at the grating. Preferable dielectric materials include gallium arsenide and zinc selenide for infrared applications and quartz and silica glass for visible light applications. Preferably the reference direction for $\beta$ is the radial direction of a polar $(r,\theta)$ coordinate system.

The scope of the present invention also includes a method of measuring the polarization state of light. The light is directed at a grating that has a transmission or reflection axis that varies in one lateral direction. Although a piecewise continuous, laterally varying grating, such as Gori's grating, may be used, it is preferable to use a grating whose transmission or reflection axis varies continuously in the one lateral direction. Most preferably, the transmission or reflection axis of the grating varies linearly in the one lateral direction. The intensity of the light that has traversed the grating is measured, and all four Stokes parameters of the light are determined from the measured intensity, preferably by performing respective integral transforms of the measured intensity.

Preferably, at least a portion of the light that emerges from the grating is caused to traverse a polarizer before the intensity of the light is measured.

As noted above, the grating need not be an optical device of the present invention, although it is preferable that the grating be substantially planar, be formed in a dielectric material, and have a space-variant, continuous grating vector $\overline{K}$ such that the transmission or reflection axis is the direction $\beta$ of $\overline{K}$.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a subwavelength dielectric grating which can be used to impose, on incident electromagnetic radiation, a laterally varying modulation of intensity and/or retardation, or a laterally varying polarization state.

The principles and operation of a subwavelength dielectric grating according to the present invention may be better understood with reference to the drawings and the accompanying description.

Gori defined his "polarization grating" as "a transparency in which the polarization of the incident wave is changed periodically along a line". The present invention is somewhat more general: an optical device, fabricated in a dielectric material, that imposes a (not necessarily periodic) laterally varying modulation of intensity and/or retardation, or alternatively a (not necessarily periodic) laterally varying polarization state, on an incident beam of electromagnetic radiation that is laterally uniform in intensity and polarization state. The lateral variation may be in one or both orthogonal directions transverse to the direction of propagation. As will be seen, lateral variation in only one transverse direction is an important special case. Alternatively, the lateral variation may be along the radial and/or azimuthal directions of a circular coordinate system.

Figure 1:
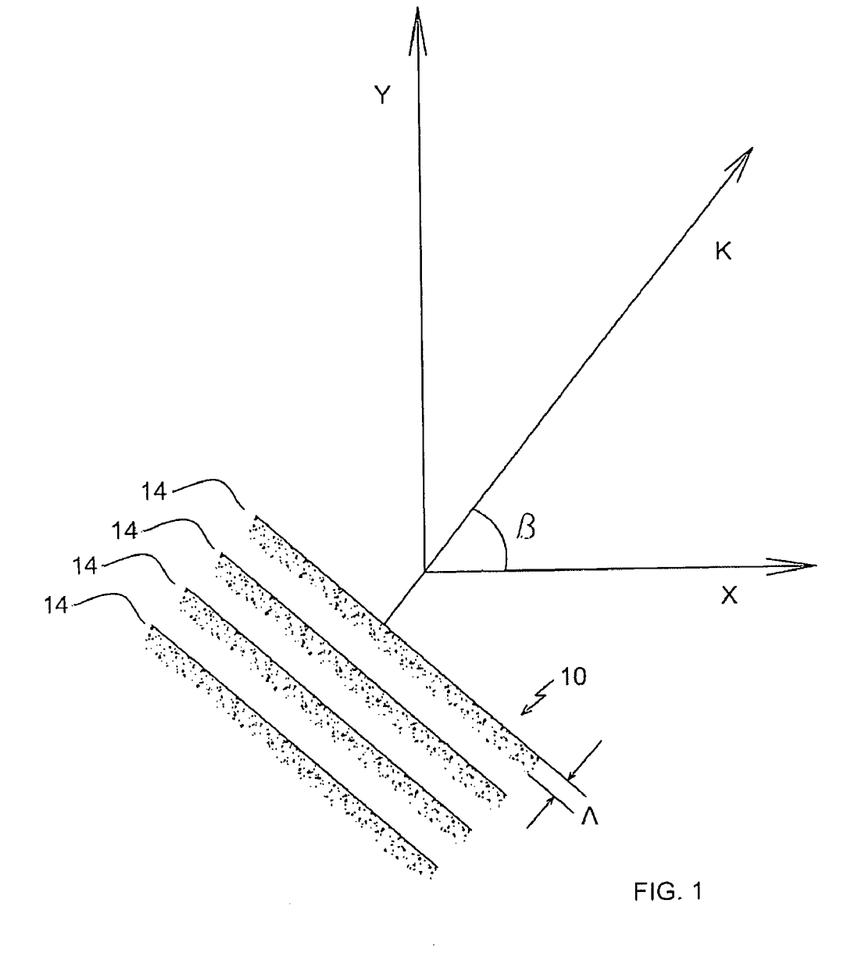
FIG. 1 illustrates the definition of the grating vector of a subwavelength grating.

Referring now to the drawings. FIG. 1 illustrates the definition of the grating vector $\overline{K}$ of a subwavelength grating 10 on which is incident a beam of electromagnetic radiation. Grating 10 consists of (locally) parallel grooves 14 in a planar dielectric substrate. The plane of the substrate is parallel to the x,y plane of a Cartesian (x, y, z) coordinate system. (See FIGS. 2A, 2B, 2C and 5B below for Scanning Electron Microscope (SEM) images of examples of such grooves in planar substrates.) For clarity, only four grooves 14 are shown in FIG. 1. The period of grating 10 is $\Lambda$. The direction of propagation of the electromagnetic radiation is perpendicular to grating 10, i.e., in the z-direction. The grating vector $\overline{K}$ is defined by its magnitude $K_0 = 2\pi/\Lambda$ and by its direction $\beta$ relative to the +x-axis as a reference direction.

As noted above, the gratings of the present invention are subwavelength gratings, i.e., gratings 10 whose local period $\Lambda$ is less than the wavelength of the incident beam.

Also as noted above, when the period of a dielectric grating is smaller than the incident wavelength, only the zeroth order is a propagating order, and the grating behaves as a layer of uniaxial crystal, with the optical axes perpendicular and parallel to the grating grooves. Therefore, by controlling the local period, structure and direction of the grating, any desired space-variant waveplate can be created.

Understanding of the present invention is facilitated by considering one of the simplest embodiments thereof: a chirp grating, i.e., a grating in which β is constant and Λ varies linearly in the x-direction: $\Lambda = \Lambda_0 + bx$. The grating vector $\vec{K}$ then is:

$$\vec{K} = \frac{2\pi}{\Lambda_0 + bx}\hat{x} \quad (1)$$

where $\hat{x}$ is a unit vector in the +x-direction.

Figure 2A:
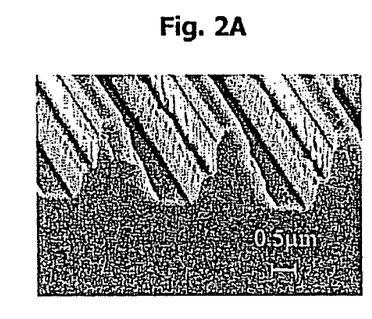
FIGS. 2A, 2B and 2C are SEM images of a chirped grating.
Figure 2B:
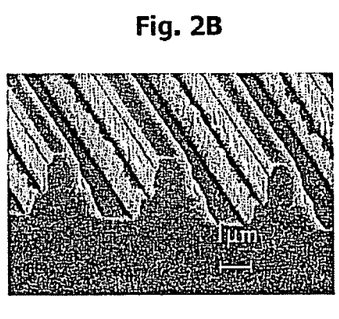
Figure 2C:
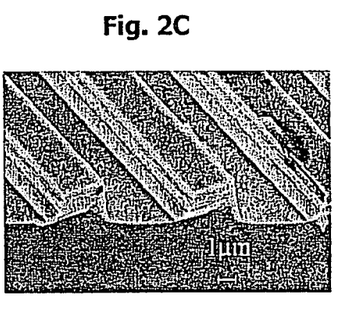

A Lee-type (W. H. Lee, "Binary synthetic holograms", *Applied Optics* vol. 13 pp. 1677–1682 (1974)) binary chirped grating was realized as a 5 millimeter by 3 millimeter rectangle with a local period Λ varying from 2 microns to 10 microns. A chrome mask of the grating was fabricated using high-resolution laser lithography. The pattern was transferred to a 500 micron thick GaAs wafer using photolithography. Then the grating was etched using electron cyclotron resonance with $BCl_3$ for 35 minutes, to a depth of about 2.5 microns, in order to obtain a retardation of 10.6 micron radiation of approximately $\pi/2$ at short periods Λ. Finally, an anti-reflection coating was applied to the back of the wafer. FIGS. 2A, 2B and 2C are SEM images of the chirped grating at periods Λ of 2 microns, 3 microns and 8 microns, respectively.

Figure 3A:
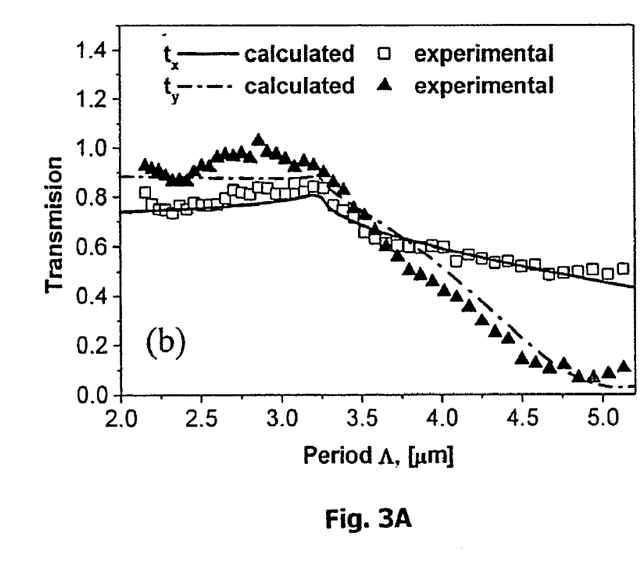
FIG. 3A is a plot of the transmission coefficient of the chirped grating as a function of period.
Figure 3B:
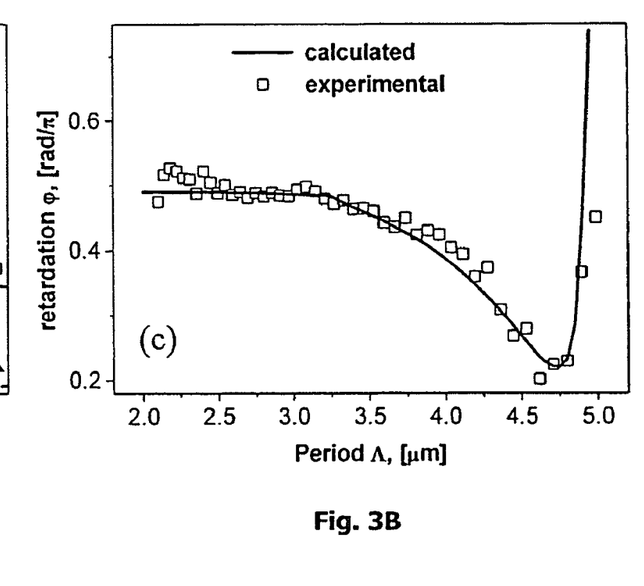
FIG. 3B is a plot of the retardation of the chirped grating as a function of period.

To determine the dependence of the transmission and retardation of the chirped grating on the local period Λ, the grating was illuminated with light from a $CO_2$ laser at a free space wavelength of 10.6 microns and the dependence of the transmission coefficients $t_x$ and $t_y$ and of the retardation φ on the grating period Λ were measured using ellipsometric techniques (E. Collet, *Polarized Light* (Marcel Dekker, New York, 1993)). FIG. 3A shows the measured transmission coefficients of the chirped grating along with the theoretical results calculated using RCWA. There is good agreement between the calculations and the measurements. FIG. 3A shows that when the grating period Λ is between 2 microns and 3.24 microns, $t_x$ and $t_y$ do not vary much and have values of around 0.95 and 0.82 respectively. At a period Λ of 3.24 microns (10.6 microns divided by the index of refraction of GaAs), there is anomalous behavior due to non-zero propagating orders within the wafer, and the transmission drops sharply. FIG. 3B shows the measured and calculated retardation φ of the chirped grating at all grating periods Λ. φ is close to $\pi/2$ at grating periods Λ between 2 microns and 4 microns. At longer periods, φ begins to vary.

The results of FIGS. 2 and 3 now will be applied to the design of a space-variant waveplate whose transmission axis that varies linearly along the x-direction and that is described by the grating vector $$\vec{K}(x, y) = K_0(x, y)\cos(ax)\hat{x} + K_0(x, y)\sin(ax)\hat{y} \quad (2)$$

where $\hat{x}$ is a unit vector in the +x-direction, as before, and $\hat{y}$ is a unit vector in the +y direction. In order for this grating to be physically realizable, the grating vector must have a vanishing curl, so that $$\frac{\partial K_0}{\partial y}\cos(ax) = \frac{\partial K_0}{\partial x}\sin(ax) + \beta K_0 \cos(ax) \quad (3)$$

Equation (3) can be solved by equating the coefficients of cos(ax) and sin(ax) to zero independently, resulting in the grating vector $$\vec{K} = \frac{2\pi}{\Lambda_0}\exp(ay)[\cos(ax)\hat{x} + \sin(ax)\hat{y}] \quad (4)$$

where $\Lambda_0$ is the period at y=0. The corresponding grating function φ(x,y), whose gradient is the grating vector, is found by integrating the grating vector along an arbitrary path in the x,y plane:

$$\phi(x, y) = \frac{2\pi}{a\Lambda_0}\sin(ax)\exp(ay) \quad (5)$$

Equations (4) and (5) show that the constraint on the continuity of the grating results in a varying period, which depends on the y-coordinate. Therefore, the retardation φ and the transmission coefficients $t_x$ and $t_y$, which depend on the period, also vary in the y-direction.

The design of a subwavelength dielectric grating for imposing a radially or azimuthally varying polarization state now will be discussed. By correctly determining the direction, period and depth of the grating, any desired continuous polarization can be obtained. Furthermore the continuity of the grating ensures the continuity of the transmitted field, thus suppressing diffraction effects that arise from discontinuity.

To obtain a radially or azimuthally varying polarization state, the grating vector must be expressed in circular (r,θ) coordinates:

$$\vec{K} = K_0(r,\theta)\cos(\beta(r,\theta))\hat{r} + K_0(r,\theta)\sin(\beta(r,\theta))\bar{\theta} \quad (6)$$

where $\hat{r}$ is a unit vector in the radial direction and $\hat{\theta}$ is a unit vector in the azimuthal direction. The direction β of the grating vector now is relative to the local radial direction as a reference direction.

Figure 4A:
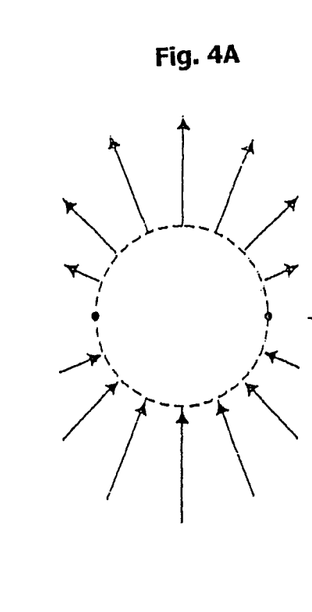
FIGS. 4A–4D illustrate the four kinds of polarization states of interest.
Figure 4B:
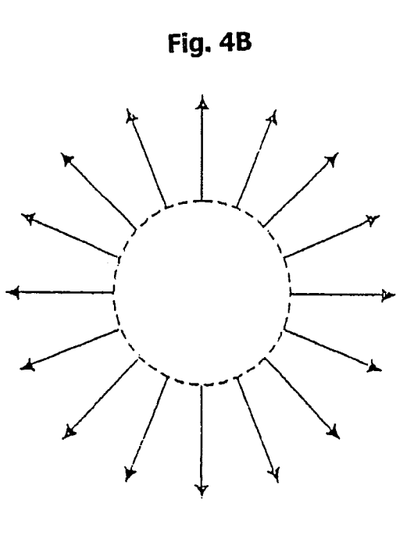
Figure 4C:
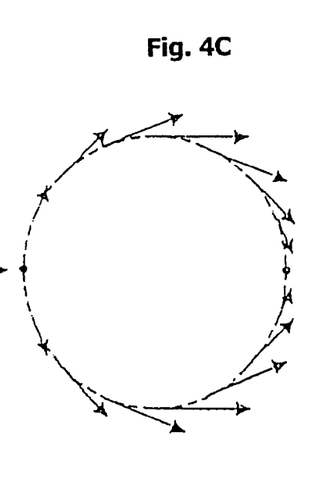
Figure 4D:
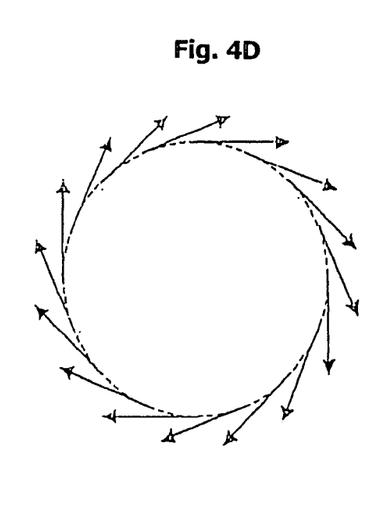

FIGS. 4A–4D illustrates the four kinds of polarization states of interest: in-phase radial (FIG. 4A), anti-phase radial (FIG. 4B), in-phase azimuthal (FIG. 4C) and anti-phase azimuthal (FIG. 4D), with continuous electromagnetic fields. In FIGS. 4A and 4C, the fields at opposite sides of the center are in-phase and at any given instance the electric fields at those points are of equal magnitude and are oriented in the same direction. This is as opposed to the fields in FIGS. 4B and 4D, for which the electric fields at opposite sides of the circle are anti-phase, so that at any given instance, these fields possess the same magnitude and are oriented in opposite directions. Because of the symmetry of the beams, it is clear that the dark center of the anti-phase polarization is conserved during propagation, as opposed to the in-phase polarization, which displays a bright center in the far field. Both types of polarization can be produced by gratings of the present invention. If the incident beam is circularly polarized, then the grating should be followed by a spiral phase element to get anti-phase polarization.

The design of a "radial" grating for converting right hand circularly polarized light into radially polarized light now will be discussed. This can be achieved using a space varying quarter waveplate, i.e., the depth and structure of the local grating is such that the retardation is $\pi/2$. In addition, $\beta$ must be $-45°$ at all points to ensure that the resulting polarization is linearly polarized in the desired direction. (Note that incident left hand circular polarized light is converted to azimuthally polarized light.) Setting $\beta$ equal to $-45°$ in equation (6) and recalling that continuity demands that the curl of the grating vector must vanish gives the following differential equation:

$$\frac{1}{r}\left(\frac{\partial}{\partial r}[-rK_0(r,\theta)] + \frac{\partial K_0(r,\theta)}{\partial \theta}\right) = 0 \quad (7)$$

Because of the symmetry of the problem, it can be assumed that $K_0$ is independent of $\theta$, in which case equation (7) can be solved to yield $K_0(r)=(2\pi r_0/\Lambda_0)/r$, where $\Lambda_0$ is the period when $r=r_0$. Integrating the resulting vector along an arbitrary path yields the grating function $$\phi=(\sqrt{2}\pi r_0/\Lambda_0)[\ln(r/r_0)-\theta] \quad (8)$$

Continuity of this function requires that $\phi(r,\theta)=\phi(r,\theta+2\pi) \pm 2\pi m$, where m is an integer, and therefore $\sqrt{2}\pi r_0/\Lambda_0$ must be an integer. This places a constraint on $r_0$ and $\Lambda_0$.

Figure 5A:
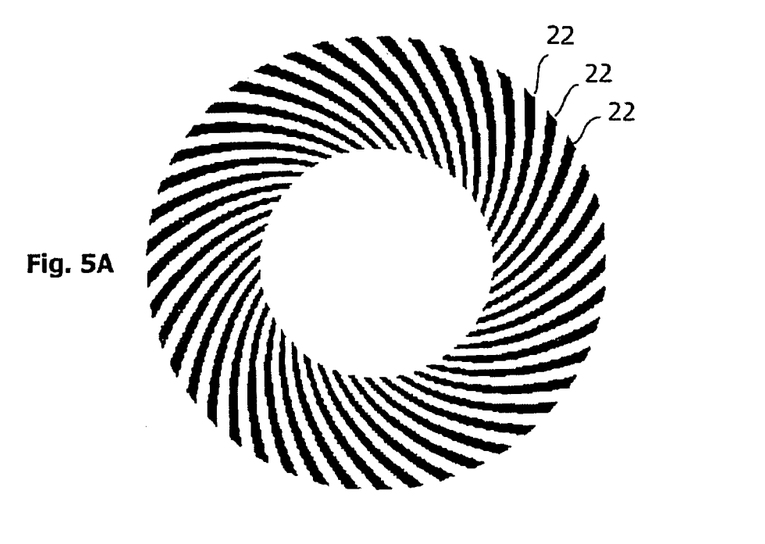
FIG. 5A is a schematic depiction of the geometry of a radial grating.
Figure 5B:
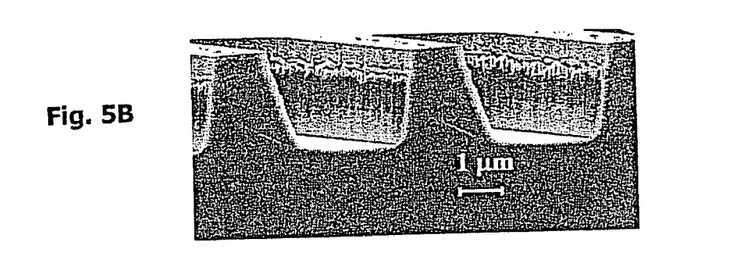
FIG. 5B is an SEM image of a radial grating.

A Lee-type binary grating corresponding to the grating function of equation (8) was realized as described above for the chirped grating, except that the duration of the etching, was 39 minutes. $\Lambda_0$ was 2 microns and $r_0$ was 5 millimeters. The range of r was from 5 millimeters to 8 millimeters, and the range of $\Lambda$ was from 2 microns to 3.2 microns, so as not to exceed the Wood anomaly. FIG. 5A is a schematic depiction of the geometry of this grating. This depiction is only schematic, in the sense that the spacing of grooves 22 as shown in FIG. 5A is much wider than any of the local periods of the actual grating. (With $r_0=5$ millimeters and $\Lambda_0=2$ microns, there should be on the order of 15,000 grooves 22 shown in FIG. 5A, rather than the 45 grooves 22 actually shown.) FIG. 5B shows a typical SEM cross section of the grating profile.

Figure 6A:
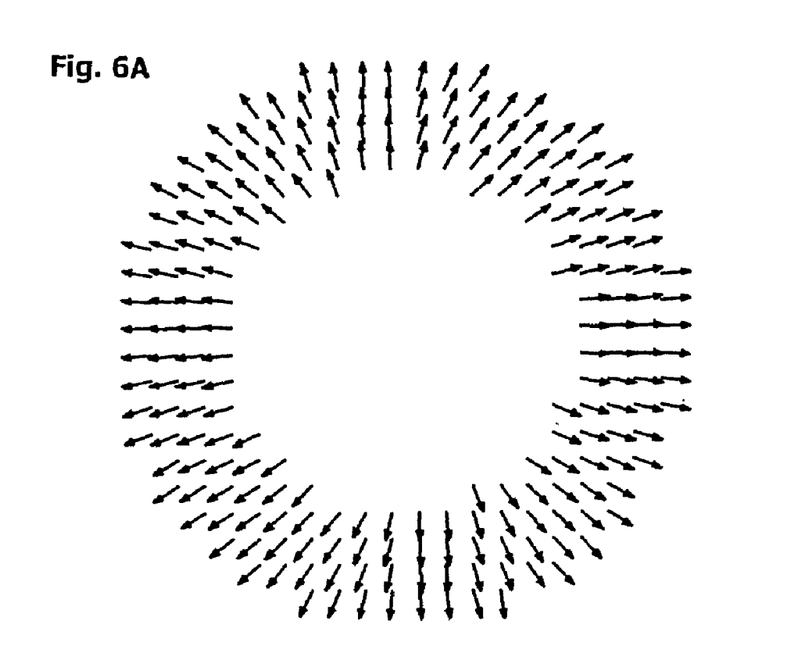
FIG. 6A shows the local azimuthal angles of a right circularly polarized light beam following transmission through the grating of FIG. 5B.
Figure 6B:
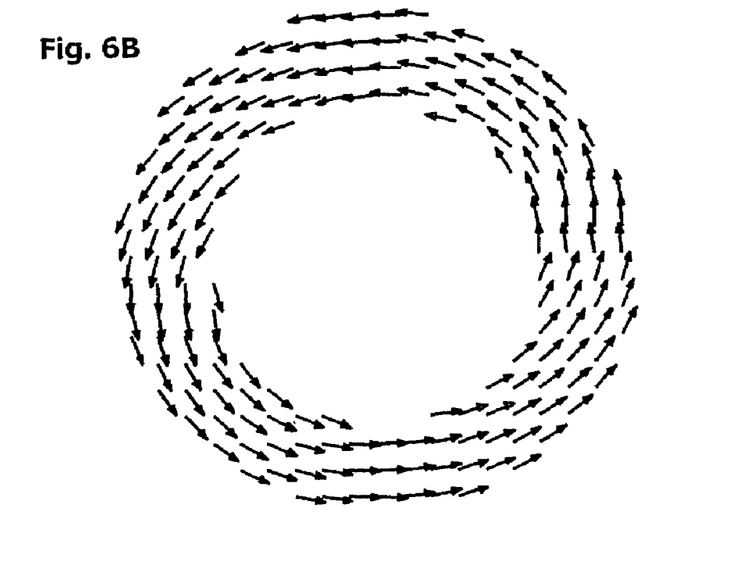
FIG. 6B shows the local azimuthal angles of a left circularly polarized light beam following transmission through the grating of FIG. 5B.

The grating corresponding to equation (11) was illuminated with 10.6 micron right hand circularly polarized light from a $CO_2$ laser. The transmitted light was imaged onto a Spiricon Pyrocam I camera, and the four Stokes parameters $S_0$, $S_1$, $S_2$ and $S_3$ were measured at each point using the four measurement technique (Collet, op. cit.). The local azimuthal angle $\psi$ was calculated from $\tan(2\psi)=S_2/S_1$. The local ellipticity $\tan\chi$ was calculated from $\sin(2\chi)=S_3/S_0$. For right hand circularly polarized light, the average ellipticity was 0.08, and the average deviation of the azimuthal angle was 2.6°, yielding a polarization purity (percentage of energy in the desired polarization) of 99.2%. The transmission was 86%. FIG. 6A shows the local azimuthal angle of the resulting beam. The arrows in FIG. 6A show radial polarization. FIG. 6B shows the local azimuthal angle when left hand circularly polarized incident light was used. The arrows in FIG. 6B show azimuthal polarization.

Three applications of the polarization grating of the present invention now will be discussed.

The first application is to polarimetry, i.e., the measurement of the polarization state of a light beam. Such measurements are used for a large range of applications, including ellipsometry (A. N. Naciri et al., "Spectroscopic generalized ellipsometry based on Fourier analysis", *Applied Optics* vol. 38 pp. 4802–4811 (1999)), biosensing (V. Sankaran et al., "Comparison of polarized light propagation in biological tissues and phantoms", *Optics Letters* vol. 24, pp. 1044–1046 (1999)), quantum computing (M. Koashi et al., "Probabilistic manipulation of entangled photons", *Physical Review A* vol. 63 article no. 0.3031 (2001)) and optical communications (P. C. Chou et al., "Real time principal state characterization for use in PMD compensators", *IEEE Photon Technology Letters* vol. 13 pp. 568–570 (2001)). One commonly used method of polarimetry is to measure the time dependent signal when the beam is transmitted through a rotating polarizer or quarter wave plate (Collet, pp. 103–107). By Fourier analysis of this signal, the Stokes parameters of the beam can be derived. This method is relatively slow, because it relies on a series of consecutive measurements. This makes this method difficult to use in applications, such as polarization mode dispersion compensation in optical communications, that require the measurement of dynamic changes in polarization.

The waveplate whose grating vector is described by equation (5) can be used to implement the space domain analog of the rotating polarizer method. By performing a Fourier analysis of the transmitted intensity, the polarization state of the incident beam can be determined in real time.

Figure 7:
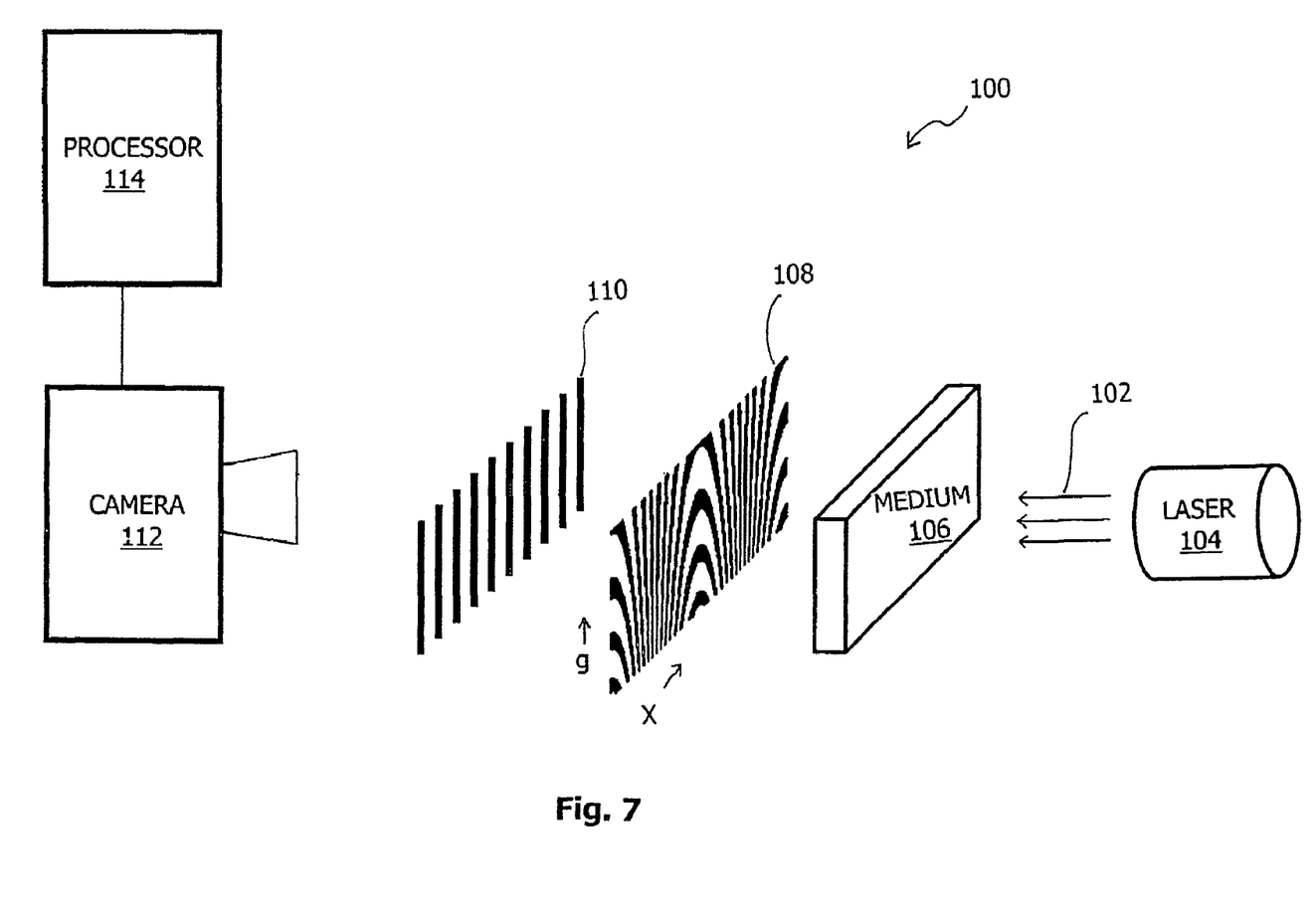
FIG. 7 is a schematic diagram of an apparatus of the present invention for measuring the polarization state of an incident light beam.

FIG. 7 is a schematic diagram of an apparatus 100 of the present invention for real time polarization measurements. A polarized light beam 102 from a laser 104 is incident on a polarization-sensitive medium 106. Examples of such polarization-sensitive media include biological tissue, optical fibers, ellipsometric samples and waveplates. Beam 102 then is transmitted through a subwavelength dielectric grating 108 of the present invention that is designed in accordance with equations (4) and (5), followed by a subwavelength metal wire polarizer 110. The resulting space variant intensity distribution is imaged onto a camera 112, and a Fourier analysis of the recorded space-variant intensity is performed by a processor 114, yielding the polarization of beam 102 incident on grating 108, thereby enabling analysis of the sample.

The polarization state of light can be described as a Stokes vector $(S_0,S_1,S_2,S_3)^T$. In general, $S_0^2 \geq S_1^2+S_2^2+S_3^2$, with equality holding only for a fully polarized beam. Waveplates and polarizers are described in the Stokes representation by 4×4 Mueller matrices. For example, a waveplate with retardation $\phi$ and with real transmission coefficients tx, ty for its two eigen-polarizations is written as:

$$W = \frac{1}{2}\begin{bmatrix} t_x^2+t_y^2 & t_x^2-t_y^2 & 0 & 0 \\ t_x^2-t_y^2 & t_x^2+t_y^2 & 0 & 0 \\ 0 & 0 & 2t_xt_y\cos\varphi & -2t_xt_y\sin\varphi \\ & & 2t_xt_y\sin\varphi & 2t_xt_y\cos\varphi \end{bmatrix} \quad (9)$$

Consequently, grating 108 whose fast axis orientation varies linearly in the x direction, followed by polarizer 110, can be described by the space-varying Mueller matrix $$M(x)=PR(-ax)WR(ax) \quad (10)$$

where a is the rate of rotation of the fast axis, $$R(ax) = \begin{bmatrix} 1 & 0 & 0 & 0 \\ 0 & \cos 2ax & \sin 2ax & 0 \\ 0 & -\sin 2ax & \cos 2ax & 0 \\ 0 & 0 & 0 & 1 \end{bmatrix} \quad (11)$$

is the Mueller matrix for a rotator, and $$P = \frac{1}{2}\begin{bmatrix} 1 & 1 & 0 & 0 \\ 1 & 1 & 0 & 0 \\ 0 & 0 & 0 & 0 \\ 0 & 0 & 0 & 0 \end{bmatrix} \quad (12)$$

is the Mueller matrix for a polarizer.

Suppose that a monochromatic plane wave in an arbitrary state of polarization $(S_0, S_1, S_2, S_3)^T$ is incident on the apparatus described by equation (10). Then the polarization state of the transmitted beam is space varying, with a Stokes vector $$(S_0'(x), S_1'(x), S_2'(x), S_3'(x))^T = M(x)(S_0, S_1, S_2, S_3)^T \quad (13)$$

The transmitted intensity, as a function of x, is $$S_0'(x) = \{AS_0 + (A+C)S_1/2 + B(S_1+S_0)\cos 2ax + \quad (14)$$
$$(BS_2 - DS_3)\sin 2ax +$$
$$(A-C)(S_1 \cos 4ax + S_2 \sin 4ax)/2\}/4$$

where $A = t_x^2 + t_y^2$, $B = t_x^2 - t_y^2$, $C = 2t_x t_y \cos\phi$ and $D = 2t_x t_y \sin\phi$. Equation (14) describes a truncated Fourier series whose coefficients depend on the Stokes parameters of the incident beam. Fourier analysis yields:

$$AS_0 + (A+C)S_1/2 = \frac{2a}{\pi}\int_0^{2\pi/a} S_0'(x)dx \quad (15)$$

$$B(S_1 + S_0) = \frac{4a}{\pi}\int_0^{2\pi/a} S_0'(x)\cos(2ax)\,dx \quad (16)$$

$$BS_2 - DS_3 = \frac{4a}{\pi}\int_0^{2\pi/a} S_0'(x)\sin(2ax)\,dx \quad (17)$$

$$(A-C)S_1/2 = \frac{4a}{\pi}\int_0^{2\pi/a} S_0'(x)\cos(4ax)\,dx \quad (18)$$

$$(A-C)S_2/2 = \frac{4a}{\pi}\int_0^{2\pi/a} S_0'(x)\sin(4ax)\,dx \quad (19)$$

from which all four Stokes parameters $S_0$, $S_1$, $S_2$ and $S_3$ can be calculated.

Equation (5) shows that the local period of grating 108 is independent of x and increases exponentially with y. Based on the discussion above of the chirped grating of the present invention, if beam 102 has a free space wavelength of 10.6 microns, then the portion of grating 108 that is actually used for polimetry should be limited to the portion of grating 108 in which the local period is between 2 microns and 3.24 microns. Because the local period of grating 108 depends on y, the intensity measurements should be made along lines that are parallel to the x-axis of grating 108, to preserve the validity of equations (14) through (19). Preferably, the varying period of grating 108 is used to reduce statistical measurement errors by performing several measurements, along several lines parallel to the x-axis of grating 108. Most preferably, these measurements are performed simultaneously.

Figure 8A:
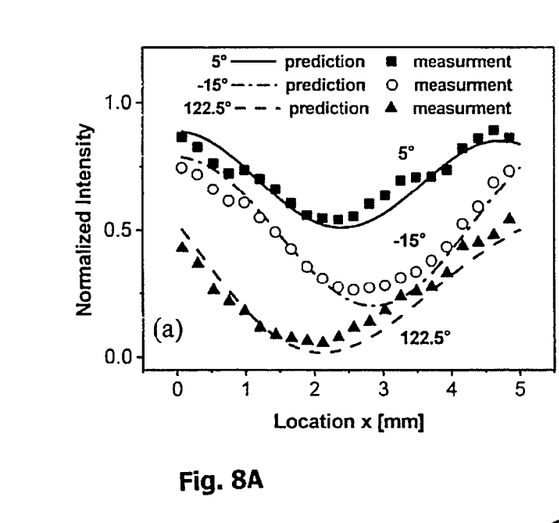
FIG. 8A is a plot of intensity, as a function of lateral position in the apparatus of FIG. 7, of an initially circularly polarized light beam that transits a quarter wave plate.
Figure 8B:
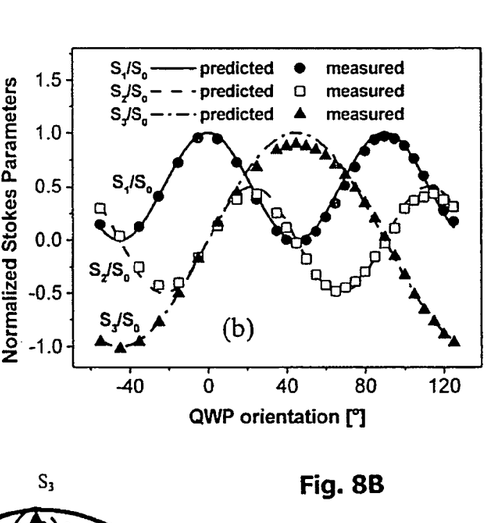
FIG. 8B is a plot of the Stokes parameters of the light beam of FIG. 8A, as measured by the apparatus of FIG. 7, as functions of the orientation of the quarter wave plate.
Figure 8C:
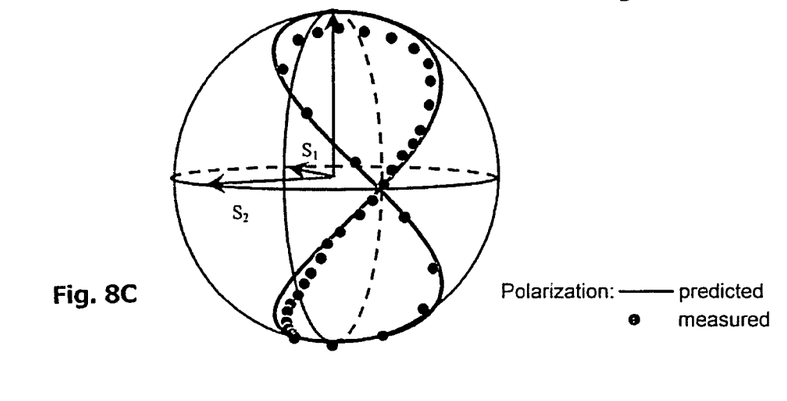
FIG. 8C depicts the Stokes parameters of FIG. 8B on a Poincare sphere.

Apparatus 100 was realized using a $CO_2$ laser 104 that emitted linearly polarized light at a free space wavelength of 10.6 microns and using a grating 108, having a transmission axis that varied periodically in the x direction, fabricated as described above for the chirped grating. To test apparatus 100, a quarter wave plate (QWP) was used for medium 106. Camera 112 was a Spiricon Pyrocam I. FIG. 8A shows the measured intensity distributions $S_0'(x)$ at a period of 2.5 microns, as well as the predicted results calculated from equation (17) when the fast axis of the QWP was at angles of −15°, 5° and 122.5°. The different incident polarizations produce distinct intensity distributions from which the corresponding Stokes parameters can be measured. FIG. 8B shows the measured and predicted Stokes parameters of the resulting beam, as a function of the orientation of the QWP. The experimental values were determined by fitting the curve of equation (17) to the measured intensity distributions with $S_1$, $S_2$ and $S_3$ as free parameters. The measurements yielded an average error of 1° in the measured azimuthal angle $\psi$ and an average error of 0.025 in the measured ellipticity $\tan\chi$. FIG. 8C depicts the same polarization measurements on a Poincare sphere. FIG. 8 provides a graphic representation that shows all four Stokes parameters simultaneously, thereby emphasizing the good agreement between the predictions and the measurements for polarized light.

Some applications, however, require analysis of partially polarized light. Such beams are characterized by their degree of polarization (DOP), defined as:

$$DOP = \{[<S_1(t)>^2 + <S_2(t)>^2 + <S_3(t)>^2]/<S_0(t)>^2\}^{1/2} \quad (23)$$

where t is time and "<>" denotes time-domain averaging. If linearly polarized light is incident on a half waveplate (HWP) rotating at angular frequency $\omega$, then $S_1(t)=\cos(4\omega t)$, $S_2(t)=\sin(4\omega t)$ and $S_3(t)=0$. The corresponding DOP is $|(\sin 2\Omega)/2\Omega|$, where $\Omega$ is the angle by which the HWP was rotated during the time span over which the averaging was performed.

Figure 9A:
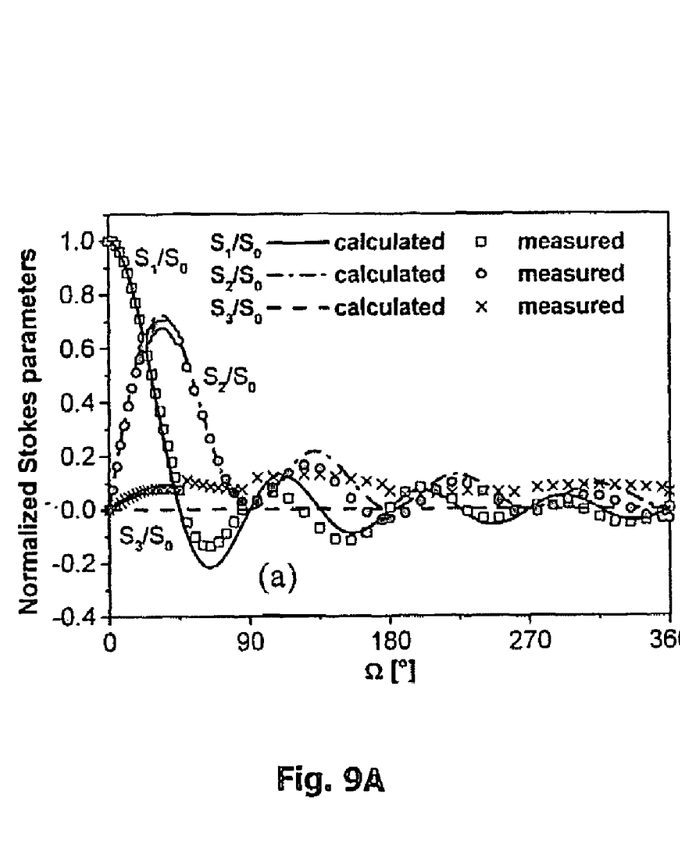
FIG. 9A is a plot of the Stokes parameters, as measured by the apparatus of FIG. 7, of an initially right circularly polarized light beam that transits a rotating half wave plate, as functions of the cumulative rotation of the half wave plate.
Figure 9B:
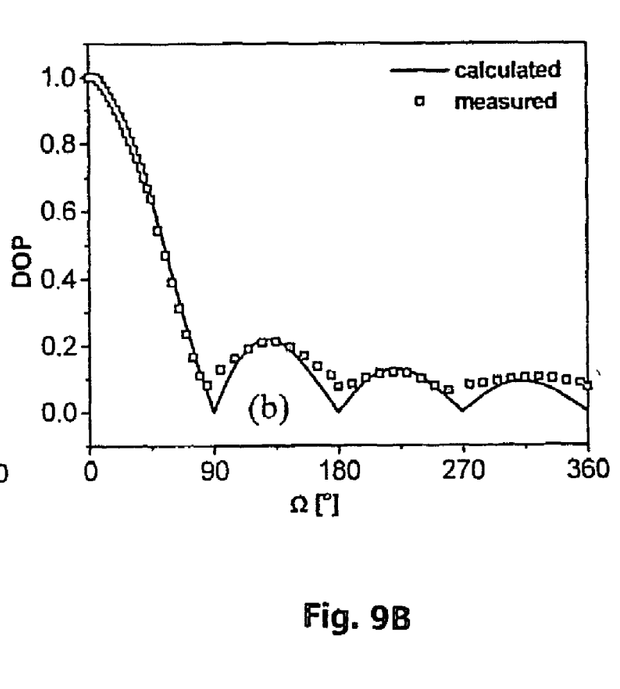
FIG. 9B is a plot of the degree of polarization of the light beam of FIG. 9A as a function of the cumulative rotation of the half wave plate.

To test the ability of apparatus 100 to analyze partial polarization, a rotating HWP was used for medium 106 and $\omega$ was chosen so that camera 112 captured an image each time the HWP rotated another 2.5°. The average intensity was calculated at each pixel of camera 112, using all images captured during the rotation of the HWP up to an angle $\Omega$. The appropriate Stokes parameters then were calculated. Based on the Stokes parameters, the dependence of the DOP on $\Omega$ was calculated. FIG. 9A shows the measured and predicted Stokes parameters as a function of $\Omega$. S3 is close to zero for all values of $\Omega$. S1 and S2 tend to zero as $\Omega$ increases. FIG. 9B shows the measured and predicted DOP. As $\Omega$ increases, both the measured DOP and the predicted DOP tend to zero.

Figure 10:
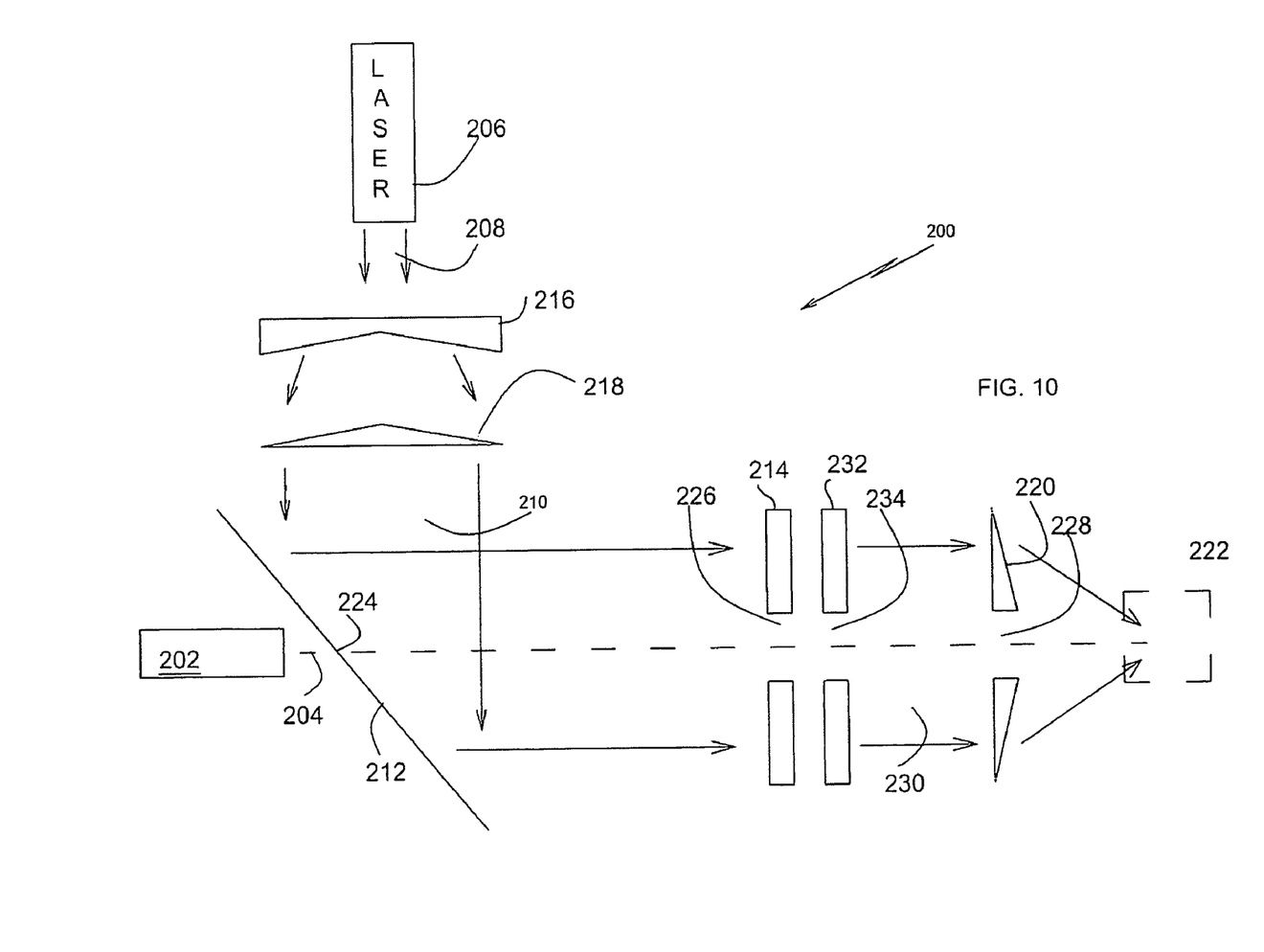
FIG. 10 is a schematic diagram of an inverse Cerenkov accelerator of the present invention.

The second application is to the acceleration of subatomic particles. FIG. 10 is a schematic diagram of an inverse Cerenkov accelerator 200 of the present invention. Accelerator 200 is similar to the accelerators described by Y. Liu et al. in "Vacuum laser acceleration using a radially polarized $CO_2$ laser beam", *Nuclear Instruments and Methods in Physics Research A* vol. 424 pp. 296–303 (1999) and by I.

V. Pogorelsky et al. in "$CO_2$ laser technology for advanced particle accelerators", a web page whose URL is
http://nslsweb.nsls.bnl.gov/AccTest/publications/co2_laser_tech.htm.

A source 202 emits a beam 204 of electrons that are to be accelerated. A carbon dioxide laser 206 emits a coherent beam 208 of 10.6 micron light. Beam 208 is converted into an annular light beam 210 by a negative axicon lens 216 and a positive axicon lens 218. An annular mirror 212 is placed to reflect annular light beam 210 parallel to electron beam 204, with electron beam 204 traversing an aperture 224 in mirror 212 so that electron beam 204 travels along the axis of annular light beam 210. A subwavelength dielectric grating 214 of the present invention, similar to the radial grating described above, followed by a spiral phase element 232 with a phase function $\exp[-i\theta(x,y)]$ (R. Oron et al., "Continuous phase elements can improve laser beam quality", *Optics Letters* vol. 25 pp. 939–941 (2000)), convert annular light beam 210 into an anti-phase, radially polarized annular light beam 230. (Note that in the absence of spiral phase element 232, grating 214 would convert light beam 210 into an in-phase, radially polarized light beam.) Alternatively, grating 214 and spiral phase element 232 are placed in the optical path from laser 206 to mirror 212, for example between laser 206 and axicon lens 216. Light beam 230 is focused onto a focal region 222 by a positive axicon lens 220. Meanwhile, electron beam 204 traverses apertures 226 and 228 in polarization grating 214 and lens 220, respectively, to enter focal region 222. In focal region 222, the longitudinal component of the electric field of light beam 230 accelerates the electrons of electron beam 204 towards the right.

The third application is to the cutting of a workpiece. As described by V. G. Niziev and A. V. Nesterov in "Influence of beam polarization on laser cutting efficiency", *Journal of Physics D: Applied Physics* vol. 32 pp. 1455–1461 (1999), which is incorporated by reference for all purposes as if fully set forth herein, the laser cutting efficiency of a radially polarized beam is 1.5 to 2 times larger than for plane P-polarized and circularly polarized beams. According to the present invention, the radially polarized beam is produced by passing a linearly or circularly polarized coherent light beam through an appropriate subwavelength dielectric grating of the present invention.

While the invention has been described with respect to a limited number of embodiments, it will be appreciated that many variations, modifications and other applications of the invention may be made.

What is claimed is:

1. An optical device, for manipulating incident light of at most a certain maximum wavelength, comprising a substantially planar grating formed in a dielectric material and having a space-variant, continuous grating vector, at least a portion of said grating having a local period less than the maximum wavelength of the incident light.

2. The device of claim 1, wherein said grating is formed as a plurality of grooves in a planar substrate of said dielectric material.

3. The device of claim 1, wherein a magnitude of said grating vector varies laterally and continuously.

4. The device of claim 1, wherein a direction of said grating vector varies laterally and continuously.

5. The device of claim 1, wherein said grating vector is periodic.

6. The device of claim 5, wherein said grating vector is translationally periodic.

7. The device of claim 5, wherein said grating vector is rotationally periodic.

8. The device of claim 1, wherein said dielectric material is selected from the group consisting of gallium arsenide, zinc selenide, quartz and silica glass.

9. The device of claim 1, wherein said grating is operative to pass laterally uniform, polarized incident light with a predetermined, laterally varying transmissivity.

10. The device of claim 9, wherein said transmissivity varies periodically in one lateral direction.

11. The device of claim 1, wherein said grating is operative to pass laterally uniform, polarized incident light with a predetermined, laterally varying retardation.

12. The device of claim 11, wherein said retardation varies periodically in one lateral direction.

13. The device of claim 1, wherein said grating is operative to reflect laterally uniform, polarized incident light with a predetermined, laterally varying reflectivity.

14. The device of claim 13, wherein said reflectivity varies periodically in one lateral direction.

15. The device of claim 1, wherein said grating is operative to reflect laterally uniform, polarized incident light with a predetermined, laterally varying retardation.

16. The device of claim 15, wherein said retardation varies periodically in one lateral direction.

17. The device of claim 1, wherein said grating is operative to transform light incident thereon into a transmitted beam having a predetermined, laterally varying polarization state.

18. The device of claim 17, wherein said transmitted beam has an azimuthal angle that varies linearly in one lateral direction.

19. The device of claim 17, wherein said transmitted beam is radially polarized.

20. The device of claim 19, wherein said radial polarization is in-phase.

21. The device of claim 19, wherein said radial polarization is anti-phase.

22. The device of claim 17, wherein said transmitted beam is azimuthally polarized.

23. The device of claim 22, wherein said azimuthal polarization is in-phase.

24. The device of claim 22, wherein said azimuthal polarization is anti-phase.

25. The device of claim 1, wherein said grating is operative to transform light incident thereon into a reflected beam having a predetermined, laterally varying polarization state.

26. The device of claim 25, wherein said reflected beam has an azimuthal angle that varies linearly in one lateral direction.

27. The device of claim 25, wherein said transmitted beam is radially polarized.

28. The device of claim 27, wherein said radial polarization is in-phase.

29. The device of claim 27, wherein said radial polarization is anti-phase.

30. The device of claim 25, wherein said reflected beam is azimuthally polarized.

31. The device of claim 30, wherein said azimuthal polarization is in-phase.

32. The device of claim 30, wherein said azimuthal polarization is anti-phase.

33. A particle accelerator comprising:
(a) a source of light;
(b) a first optical mechanism for forming said light into an annular beam;

(c) the device of claim 1, for imposing radial polarization on said annular beam;

(d) a second optical mechanism for focusing said radially polarized annular beam onto a focal region; and (e) a particle source for directing a beam of the particles longitudinally through said focal region.

34. A method of cutting a workpiece, comprising the steps of:

(a) providing a beam of light;

(b) imposing radial polarization on said beam of light, using the device of claim 1; and (c) directing said radially polarized beam at the workpiece to cut the workpiece.

35. An apparatus for measuring a polarization state of light, comprising:

(a) the device of claim 1; and (b) a mechanism for measuring a lateral variation of an intensity of the light after the light has been manipulated by the device of claim 1.

36. A method of modulating laterally uniform, polarized light of at most a certain maximum wavelength, comprising the steps of:

(a) solving an equation $$\nabla \times \overline{K}(K_0, \beta) = 0$$

for a grating vector $\overline{K}$ that is defined by a wavenumber $K_0$ and by a direction $\beta$ relative to a reference direction, the modulation depending on $\beta$, at least one of $K_0$ and $\beta$ being space-variant, $\overline{K}$ being such that at least a portion of a grating fabricated in accordance with $\overline{K}$ has a local period less than the maximum wavelength of the light;

(b) fabricating said grating in a dielectric material in accordance with said grating vector $\overline{K}$; and (c) directing the light at said grating.

37. The method of claim 36, wherein said grating is fabricated as a plurality of grooves in a planar substrate of said dielectric material.

38. The method of claim 36, wherein said dielectric material is selected from the group consisting of gallium arsenide, zinc selenide, quartz and silica glass.

39. A method of imposing a laterally varying polarization state on light of at most a certain maximum wavelength, comprising the steps of:

(a) solving an equation $$\nabla \times \overline{K}(K_0, \beta) = 0$$

for a grating vector $\overline{K}$ that is defined by a wavenumber $K_0$ and by a direction $\beta$ relative to a reference direction, the laterally varying polarization state being at least partially defined by $\beta$, at least one of $K_0$ and $\beta$ being space-variant, $\overline{K}$ being such that at least a portion of a grating fabricated in accordance with $\overline{K}$ has a local period less than the maximum wavelength of the light;

(b) fabricating said grating in a dielectric material in accordance with $\overline{K}$; and (c) directing the light at said grating.

40. The method of claim 39, wherein said grating is fabricated as a plurality of grooves in a planar substrate of said dielectric material.

41. The method of claim 39, wherein said reference direction is a radial direction of a polar $(r, \theta)$ coordinate system.

42. The method of claim 39, wherein said dielectric material is selected from the group consisting of gallium arsenide, zinc selenide, quartz and silica glass.

43. An optical device, for transforming an incident beam of light into a transformed beam of light, comprising a substantially planar grating formed in a dielectric material and having a space-variant continuous grating vector, such that the transformed beam is substantially free of propagating orders higher than zero order.

44. The device of claim 43, wherein said grating is formed as a plurality of grooves in a planar substrate of said dielectric material.

45. The device of claim 43, wherein a magnitude of said grating vector varies laterally and continuously.

46. The device of claim 43, wherein a direction of said grating vector varies laterally and continuously.

47. The device of claim 43, wherein said grating vector is periodic.

48. The device of claim 43, wherein said transformed beam is a transmitted beam, and wherein said grating is operative to pass laterally uniform, polarized incident light with a predetermined, laterally varying transmissivity.

49. The device of claim 43, wherein said transformed beam is a transmitted beam, and wherein said grating is operative to pass laterally uniform, polarized incident light with a predetermined, laterally varying retardation.

50. The device of claim 43, wherein said transformed beam is a reflected beam, and wherein said grating is operative to reflect laterally uniform, polarized incident light with a predetermined, laterally varying reflectivity.

51. The device of claim 43, wherein said transformed beam is a reflected beam, and wherein said grating is operative to reflect laterally uniform, polarized incident light with a predetermined, laterally varying retardation.

52. The device of claim 43, wherein the transformed beam is a transmitted beam having a predetermined, laterally varying polarization state.

53. The device of claim 43, wherein the transformed beam is a reflected beam having a predetermined, laterally varying polarization state.

54. A particle accelerator comprising:

(a) a source of light;

(b) a first optical mechanism for forming said light into an annular beam;

(c) the device of claim 43, for imposing radial polarization on said annular beam, (d) a second optical mechanism for focusing said radially polarized annular beam onto a focal region; and (e) a particle source for directing a beam of the particles longitudinally through said focal region.

55. A method of cutting a workpiece, comprising the steps of:

(a) providing a beam of light;

(b) imposing radial polarization on said beam of light, using the device of claim 43; and (c) directing said radially polarized beam at the workpiece to cut the workpiece.

56. An apparatus for measuring a polarization state of light comprising:

(a) the device of claim 43; and (b) a mechanism for measuring a lateral variation of an intensity of the light after the light has been transformed by the device of claim 50.

57. A method of transforming an incident beam of laterally uniform, polarized light into a modulated transmitted beam, comprising the steps of:

(a) solving an equation $$\nabla \times \overline{K}(K_0,\beta)=0$$

for a grating vector $\overline{K}$ that is defined by a wavenumber $K_0$ and by a direction $\beta$ relative to a reference direction, the modulation depending on $\beta$, at least one of $K_0$ and $\beta$ being space-variant, $\overline{K}$ being such that the transmitted beam is substantially free of propagating orders higher than zero order;

(b) fabricating said grating in a dielectric material in accordance with said grating vector $\overline{K}$; and (c) directing the light at said grating.

58. The method of claim 57, wherein said grating is fabricated as a plurality of grooves in a planar substrate of said dielectric material.

59. A method of transforming an incident light beam into a transmitted beam upon which is imposed a laterally varying polarization state, comprising the steps of:

(a) solving an equation $$\nabla \times \overline{K}(K_0,\beta)=0$$

for a grating vector $\overline{K}$ that is defined by a wavenumber $K_0$ and by a direction $\beta$ relative to a reference direction, at least one of $K_0$ and $\beta$ beam space-variant, the laterally varying polarization state being at least partially defined by $\beta$, $\overline{K}$ being such that the transmitted beam is substantially free of propagating orders higher than zero order;

(b) fabricating said grating in a dielectric material in accordance with $\overline{K}$; and (c) directing the light at said grating.

60. The method of claim 59, wherein said grating is fabricated as a plurality of grooves in a planar substrate of said dielectric material.

* * * * *